United States Patent
Götz

(10) Patent No.: US 10,021,020 B2
(45) Date of Patent: Jul. 10, 2018

(54) CONTROL APPARATUS, NETWORK NODE AND METHOD FOR INTERCHANGING DATA VIA A DATA NETWORK

(71) Applicant: SIEMENS AKTIENGESELLSCHAFT, München (DE)

(72) Inventor: Franz-Josef Götz, Heideck (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 30 days.

(21) Appl. No.: 14/902,471

(22) PCT Filed: Jul. 1, 2013

(86) PCT No.: PCT/EP2013/063780
§ 371 (c)(1),
(2) Date: Dec. 31, 2015

(87) PCT Pub. No.: WO2015/000498
PCT Pub. Date: Jan. 8, 2015

(65) Prior Publication Data
US 2016/0197820 A1    Jul. 7, 2016

(51) Int. Cl.
| | | |
|---|---|---|
| *H04L 12/707* | (2013.01) |
| *H04L 12/735* | (2013.01) |
| *H04L 12/721* | (2013.01) |
| *H04L 12/803* | (2013.01) |
| *H04L 12/911* | (2013.01) |

(52) U.S. Cl.
CPC .......... *H04L 45/22* (2013.01); *H04L 45/1283* (2013.01); *H04L 45/66* (2013.01); *H04L 47/125* (2013.01); *H04L 47/728* (2013.01)

(58) Field of Classification Search
CPC ... H04L 45/1283; H04L 45/66; H04L 47/728; H04L 47/125; H04L 45/22
See application file for complete search history.

(56) References Cited

U.S. PATENT DOCUMENTS

| | | |
|---|---|---|
| 2002/0012317 A1 | 1/2002 | Sakamoto et al. |
| 2004/0114582 A1 | 6/2004 | Götz |
| 2004/0131066 A1 | 7/2004 | Götz |
| 2006/0007852 A1 | 1/2006 | Brueckner et al. |
| 2007/0140147 A1 | 6/2007 | Touve |

(Continued)

FOREIGN PATENT DOCUMENTS

| | | |
|---|---|---|
| CN | 101005498 A | 7/2007 |
| DE | 10243384 B4 | 10/2006 |

(Continued)

*Primary Examiner* — Jae Y Lee
(74) *Attorney, Agent, or Firm* — Henry M. Feiereisen LLC

(57) ABSTRACT

A control apparatus includes a first apparatus for ascertaining at least one primary data path between a first and a second data terminal device, which are connected to a data network, a second apparatus for selecting one of the ascertained primary data paths and a third apparatus for ascertaining at least one alternative data path between the first and the second data terminal device, which alternative data path has no common transmission links with the selected primary data path. A corresponding network node and a corresponding method for operating the apparatus are also described.

5 Claims, 2 Drawing Sheets

(56) References Cited

U.S. PATENT DOCUMENTS

| | | |
|---|---|---|
| 2009/0245136 A1 | 10/2009 | Kano |
| 2012/0213079 A1 | 8/2012 | Conway |
| 2013/0315062 A1* | 11/2013 | Riedl .................. H04L 41/0663 370/230 |
| 2014/0177477 A1* | 6/2014 | Cachin .................. H04L 45/128 370/256 |

FOREIGN PATENT DOCUMENTS

| | | |
|---|---|---|
| EP | 1168714 A2 | 1/2002 |
| EP | 1163714 A3 | 5/2009 |
| EP | 2568673 A1 | 3/2013 |

\* cited by examiner

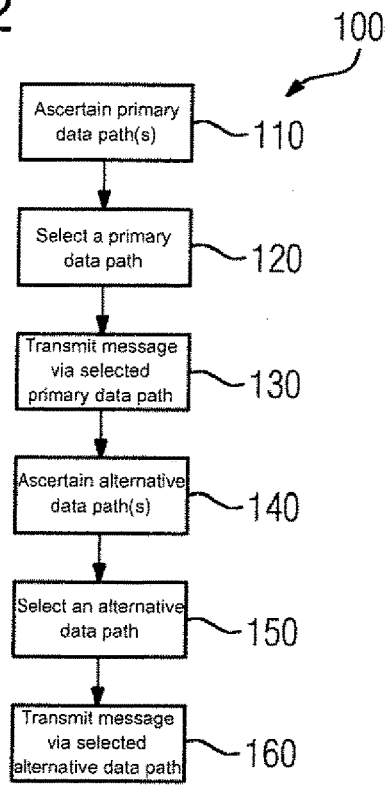
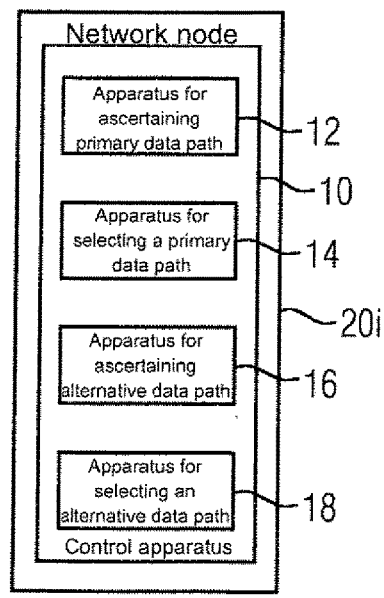

CONTROL APPARATUS, NETWORK NODE AND METHOD FOR INTERCHANGING DATA VIA A DATA NETWORK

CROSS-REFERENCES TO RELATED APPLICATIONS

This application is the U.S. National Stage of International Application No. PCT/EP2013/063780, filed Jul. 1, 2013, which designated the United States and has been published as International Publication No. WO 2015/000498, pursuant to 35 U.S.C. 119(a)-(d).

BACKGROUND OF THE INVENTION

The invention relates to a control apparatus.

Furthermore, the invention relates to a network node. The network node can be used to set up a data network (for example for automation, medical, transport or traffic applications). The terms network node and data network node are also customary for network nodes. A data network can be regarded as a (digital) communication network.

In addition, the invention relates to a method for interchanging data via a data network to which a first and a second data terminal device are connected, wherein the data network has a multiplicity of network nodes and network nodes in a multiplicity of pairs of the network nodes are respectively connected by means of at least one transmission link. Data that are interchanged via the data network can also be referred to as messages. The data are usually transmitted on a packet-by-packet basis, that is to say in data packets, which are also referred to as telegrams or data telegrams.

In order to improve an availability of installations (for example industrial installations), installation parts are designed to be redundant. Such installations can require that a temporary interruption in a data transmission owing to a technical fault in a single network component (single point of failure) lasts no longer than one processing cycle of a control application in the installation. The length of a processing cycle is typically shorter than 1 ms. A distinction is drawn between media redundancy and system redundancy. In order to ensure media redundancy, layer 2 data networks are set up in parallel or ring structures are used.

For each of the two media-redundant topologies, a respective protocol has been standardized in the international standard IEC 62439-3, Industrial communication networks—High availability automation networks—Part 3: Parallel Redundancy Protocol (PRP) and High-availability Seamless Redundancy (HSR). The Parallel Redundancy Protocol (PRP) supports parallel data networks. The High-availability Seamless Redundancy protocol (HSR protocol) supports ring structures.

A common feature of both protocols (PRP, HSR) is that high-availability time-critical data from a first terminal station are (duplicated and) supplied to the data network via different network accesses and are then transmitted to a second terminal station in parallel via disjunct data paths in the data network. At the second terminal station or at an output coupler, duplicates (redundant packets) are filtered out. The transmission of high-availability and time-critical data packets via disjunct parallel data paths is used to ensure seamless redundancy through the medium. This means that no reconfiguration time is required after an interruption (a temporary failure) in one of the data paths (or the network nodes). Even after an interruption in one of the data paths has been removed, no reconfiguration time is required. Two data paths are disjunct with respect to one another if they have no shared transmission links.

PRP requires two separate data networks that must not be connected to one another via network couplers (for example bridges).

HSR has a similar problem when rings are connected via network couplers. If the ports on the ring coupler are inadvertently transposed, for example, the two rings can fuse into one large ring. Furthermore, neither the HSR protocol nor the PRP protocol provides for overload protection.

In order to guarantee ring separation (as is necessary for HSR) or data network separation (as is necessary for PRP), setup guidelines are issued. However, this does not ensure (in a technical, intrinsic manner) that such setup guidelines are also observed. It is known practice to monitor observance of setup guidelines using data network monitoring, however.

The need for network-dedicated overload protection is avoided today through careful project planning by ascertaining expected volumes of data traffic and using organizational measures to ensure that network nodes for which there is no provision in the network planning are not connected. Data networks that have undergone such project planning are also referred to as 'engineered networks'. A disadvantage of this approach is that expected volumes of data traffic in the data network need to be known. This complicates scalability for such data networks.

SUMMARY OF THE INVENTION

The invention is based on the object of providing a control apparatus, a network node and a method for interchanging data via a data network that reduces outlay for producing and observing setup guidelines without relinquishing seamless redundancy with overload protection.

The invention achieves this object by virtue of a control apparatus comprising the following apparatuses: an apparatus for ascertaining at least one primary data path between a first and a second data terminal device that are connected to a data network, an apparatus for selecting one of the ascertained primary data paths, an apparatus for ascertaining at least one alternative data path between the first and the second data terminal device, which at least one alternative data path has no shared transmission links with the selected primary data path.

The network node according to the invention comprises a control apparatus according to the invention.

Accordingly, the method according to the invention for interchanging data via a data network to which a first and a second data terminal device are connected comprises the following steps: ascertainment of at least one primary data path between the first and the second data terminal device; selection of one of the ascertained primary data paths; transmission of a message from the first data terminal device to the second data terminal device via the selected primary data path; ascertainment of at least one alternative data path between the first and the second data terminal device, which at least one alternative data path has no shared transmission links with the selected primary data path; transmission of the message from the first data terminal device to the second data terminal device via at least one of the ascertained alternative data paths. In this case, the data network has a multiplicity of network nodes, wherein network nodes in a multiplicity of pairs of the network nodes are respectively connected by means of at least one transmission link. The method steps can also be performed in any other order, so long as the respective step has its requirements met beforehand in each case. By way of example, the step of transmission of a message via the selected primary data path requires prior ascertainment of a primary data path.

One concept of the present invention can be considered to be that, in addition to the primary data path, at least one alternative data path between the first and the second data terminal device is ascertained that has no shared transmission links with the selected primary data path.

In a development of the control apparatus, the control apparatus also comprises an apparatus for selecting at least one of the ascertained alternative data paths. The effect that can be achieved by this is that, of a plurality of possible alternative data paths, an alternative data path is used that (when measured using one or more predetermined selection criteria) is best suited to the production of seamless redundancy.

Accordingly, in one development of the method, the method also comprises, after the ascertainment of at least one alternative data path and before the transmission of the message, a step of selection of at least one of the ascertained alternative data paths and the transmission of the message from the first data terminal device to the second data terminal device is effected via the selected alternative data path(s). The effect that can be achieved by this is that the message to be transmitted is transmitted via that instance (or those instances) of a plurality of possible alternative data paths that, when measured using one or more predetermined selection criteria, is (or are) best suited to the production of seamless redundancy.

In another development of the method, the primary data path is ascertained by means of a layer 2 protocol and/or the alternative data paths are ascertained by means of a layer 2 protocol. As a result, fundamental precautions for the production of seamless redundancy are superfluous in higher protocol layers.

A further advantageous option involves the primary data path being selected by means of a layer 2 protocol and/or the at least one alternative data path being selected by means of a layer 2 protocol. As a result, precautions for selection of the data paths that are needed for seamless redundancy are superfluous in higher protocol layers.

It is preferred if a bandwidth reservation is performed for the selected primary data path and/or for a selected alternative data path. This provides overload protection that can be matched to a change in a volume of data traffic.

Furthermore, it is advantageous if the bandwidth reservation is performed by means of a layer 2 protocol. As a result, precautions for matching the data network, for matching a control apparatus of the data network and/or for matching a data path to a change in a volume of data traffic are superfluous in higher protocol layers.

BRIEF DESCRIPTION OF THE DRAWING

The invention is explained in more detail with reference to the appended drawings, in which:

FIG. 2 schematically shows a flow for a method for interchanging data via a data network;

FIG. 3 schematically shows a design for a control apparatus for controlling an interchange of data via a data network.

DETAILED DESCRIPTION OF PREFERRED EMBODIMENTS

Figure 1:
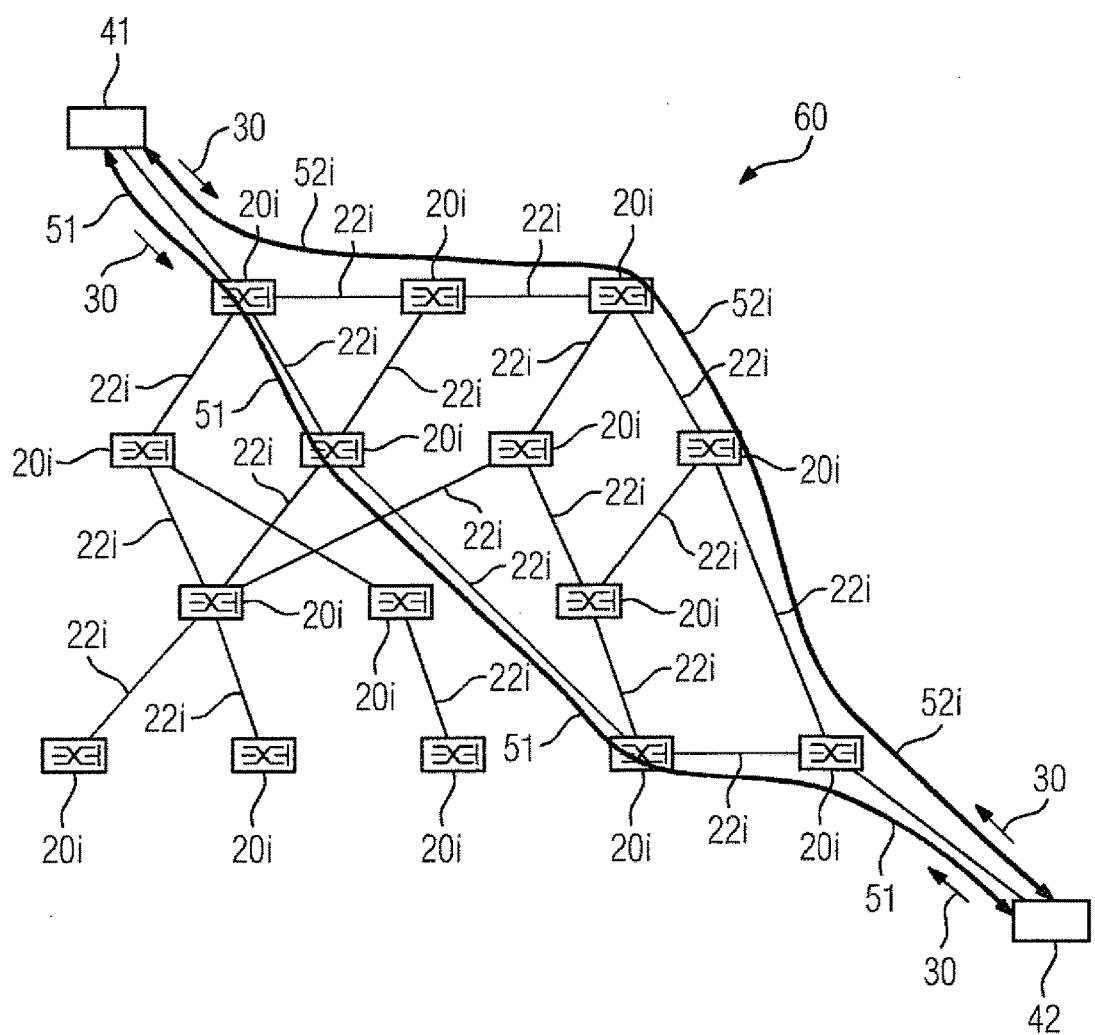
FIG. 1 schematically shows a primary data path and an alternative data path between a first and a second data terminal device in a data network.

The exemplary embodiments outlined in more detail below are preferred embodiments of the present invention.

FIG. 1 shows a layer 2 data network 60 having a multiplicity of audio/video bridges 20*i* that each have a layer 2 routing function. Pairs of the audio/video bridges 20*i* are connected by means of transmission links 22*i* (links 22*i*) for transmitting data 30 (particularly data packets). A first audio/video bridge 20*i* has a first data terminal device 41 connected to it. Furthermore, another, second audio/video bridge 20*i* has a second data terminal device 42 connected to it.

In order to ensure seamless redundancy with overload protection in the data network 60 regardless of the topology of the data network 60, data transmission between the first data terminal device 41 and the second data terminal device 42 can be effected with the following features:
1. Separation of high-availability, time-critical data traffic from data traffic whose control can be dependent on a current availability of data transmission resources 201, 221.
2. Bandwidth reservation by means of a bandwidth reservation protocol in order to provide overload protection.
3. Ascertainment and selection of a primary data path 51 and at least one alternative data path 52*i* for transmitting high-availability, time-critical data packets 30 in the data network 60 taking account of a traffic load in the data network 60.

A data network 60 that has these three features guarantees (robust, media-redundant) transmission of data. The reliability of the transmission of the high-availability, time-critical data 30 (particularly data packets) is as independent as possible of an actual traffic load and/or the actual distribution thereof in the network.

The separation of high-availability, time-critical data traffic from data traffic whose control can be dependent on a current availability of data transmission resources 201, 22*i* can be achieved, by way of example, by means of transmission of the data 30 (particularly data packets) of the two traffic types with different priorities and/or by means of transmission of the two traffic types via different virtual LANs (VLAN=virtual local area network) (for example as described in the IEEE 802.1Q standard).

For the bandwidth reservation, it is possible to use what is known as an engineered network protocol, for example, as described in the IEEE 802.1Q standard, for example.

The ascertainment and selection of a primary data path 51 for high-availability, time-critical data 30 (particularly data packets) taking account of a traffic load in the data network 60 can be effected by means of a layer 2 protocol. A protocol that can be used to perform the ascertainment and selection of the primary data path 51 is shortest path bridging (SPB), for example, which is described in the IEEE 802.1 standard. It is also possible for the alternative data path(s) 52*i* to be ascertained and selected by means of a layer 2 routing protocol. A protocol that allows ascertainment and selection of a primary data path 51 can be extended by means of further development by a person skilled in the art so that, additionally, it is also possible for one or more alternative data paths 52*i* to be sought and selected.

By combining the proposed measures using a routing protocol, it is possible to achieve media redundancy in a data network 60. The use of the bandwidth reservation protocol ensures overload protection for high-availability time-critical data 30 (particularly data packets), since data 30 can be supplied to a data network 60 only if there is sufficient bandwidth available therefor in the data network 60. A data network 60 that meets the requirements described can ensure redundancy protection and overload protection by nature.

This allows project-specific, tailored measures, development outlays and/or administrative outlays to be saved.

The proposed method 100 for interchanging data 30 (particularly data packets) via a data network 60 has the following features:

High-availability, time-critical realtime data 30 are transmitted simultaneously on different (disjunct) data paths 51, 52$i$ via mutually independent, redundant transmission links 22$i$.

The different (disjunct) data paths 51, 52$i$ for the high-availability, time-critical data 30 are ascertained at runtime by means of a layer 2 routing protocol (for example by means of a shortest path bridging protocol, i.e. by means of an SPB protocol).

Optionally, the method 100 may additionally have any genuine or ungenuine subset of the following features:

separation of resources in the data network components 20$i$, 22$i$ for a high-availability, time-critical data traffic and for other traffic types;

bandwidth reservation for high-availability, time-critical data traffic;

support for data traffic with conventional communication protocols (for example by means of TCP/IP, UDP).

The proposed measures can be used to transmit all three cited types of data traffic simultaneously in one and the same data network 60 without project-specific adjustments.

Realization can be effected by means of Ethernet technologies by applying mechanisms for audio/video bridging and/or by using mechanisms for "High-availability Seamless Redundancy".

The concepts proposed here are suitable for setting up data networks 60 in automation, medical, transport or traffic applications, for example. An industrial standard that can be developed basically in the manner described is PROFI NET® from Siemens®.

FIG. 2 shows a method 100 for interchanging data 30 (particularly data packets) via a data network 60 to which a first 41 and a second 42 data terminal device are connected, wherein the data network 60 has a multiplicity of network nodes 20$i$ and network nodes 20$i$ in a multiplicity of pairs of the network nodes 20$i$ are respectively connected by means of at least one transmission link 22$i$. In a first step 110, at least one primary data path 51 between the first 41 and the second 42 data terminal device is ascertained. In a second step 120, one of the ascertained primary data paths 51 is selected. In a third step 130, a message 30 is transmitted from the first data terminal device 41 to the second data terminal device 42 via the selected primary data path 51. In a fourth step 140, at least one alternative data path 52$i$ between the first 41 and the second 42 data terminal device is ascertained that has no shared transmission links 22$i$ with the selected primary data path 51. In a fifth step 150, at least one of the ascertained alternative data paths 52$i$ is selected. In a sixth step 160, the message 30 is transmitted from the first data terminal device 41 to the second data terminal device 42 via the selected alternative data path(s) 52$i$.

FIG. 3 shows a network node 20$i$ and a control apparatus 10 that comprises an apparatus 12 for ascertaining at least one primary data path 51 between a first 41 and a second 42 data terminal device that are connected to a data network 60. Furthermore, the control apparatus 10 comprises an apparatus 14 for selecting one of the ascertained primary data paths 51 and an apparatus 16 for ascertaining at least one alternative data path 52$i$ between the first 41 and the second 42 data terminal device, which at least one alternative data path has no shared transmission links with the selected primary data path 51.

A development of the network node 20$i$ comprises an apparatus 18 for selecting at least one of the ascertained alternative data paths 52$i$.

Although the invention has been illustrated and described in more detail by means of preferred exemplary embodiments, the invention is not restricted by the disclosed examples, and other variations can be derived therefrom by a person skilled in the art without departing from the scope of protection of the invention.

What is claimed is:

1. A method for interchanging highly available time-critical data via a data network to which a first data terminal device and a second data terminal device are connected, wherein the data network comprises a plurality of network nodes and at least one transmission path connecting pairs of the respective network nodes, the method comprising:

separating highly available time-critical data traffic from such data traffic whose handling is allowed to depend from an actual availability of data transmission resources;

ascertaining at least one primary data path for transmitting highly available time-critical messages between the first data terminal device and the second data terminal device by taking into account a traffic load;

selecting one of the at least one ascertained primary data paths;

transmitting one of the highly available time-critical messages from the first data terminal device to the second data terminal device via the selected primary data path;

ascertaining at least one alternative data path for transmitting the highly available time-critical messages between the first data terminal device and the second data terminal device by taking into account a traffic load, wherein the at least one alternative data path has no common transmission path with the selected primary data path; and transmitting the highly available time-critical message from the first data terminal device to the second data terminal device via at least one of the ascertained alternative data paths and;

only if there is sufficient bandwidth available in the data network, reserving a bandwidth for the at least one selected primary data paths and the at least one ascertained alternative data path, thereby providing redundancy protection and overload protection.

2. The method of claim 1, further comprising, after ascertaining the at least one alternative data path and before transmitting the one highly available time-critical message, selecting at least one of the ascertained alternative data paths and transmitting the highly available time-critical message from the first data terminal device to the second data terminal device via the selected alternative data path(s).

3. The method of claim 1, wherein at least one of the primary data path and the alternative data paths are ascertained by a layer-2 protocol.

4. The method of claim 1, wherein at least one of the primary data path and the at least one alternative data path are selected by a layer-2 protocol.

5. The method of claim 1, wherein the bandwidth is reserved performed by a layer-2 protocol.

* * * * *